United States Patent
Chou et al.

(10) Patent No.: US 8,969,459 B2
(45) Date of Patent: Mar. 3, 2015

(54) WHITE COATING COMPOSITION, AND DEVICE EMPLOYING COATING MADE THEREFROM

(71) Applicant: Industrial Technology Research Institute, Hsinchu (TW)

(72) Inventors: Tsung-Yi Chou, Hsinchu (TW); Chyi-Ming Leu, Jhudong Township, Hsinchu County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 14/022,689

(22) Filed: Sep. 10, 2013

(65) Prior Publication Data

US 2014/0128528 A1 May 8, 2014

(30) Foreign Application Priority Data

Nov. 5, 2012 (TW) .............................. 101140929 A

(51) Int. Cl.
- C09D 7/12 (2006.01)
- C08K 3/34 (2006.01)
- C09D 183/04 (2006.01)

(52) U.S. Cl.
CPC ................ C08K 3/34 (2013.01); C09D 183/04 (2013.01)
USPC ............................ 524/430; 524/437; 524/588

(58) Field of Classification Search
None
See application file for complete search history.

(56) References Cited

U.S. PATENT DOCUMENTS

| | | | |
|---|---|---|---|
| 4,701,503 A * | 10/1987 | Sato | 525/478 |
| 5,514,213 A | 5/1996 | Matsumoto et al. | |
| 5,693,442 A | 12/1997 | Weiss et al. | |
| 5,945,172 A * | 8/1999 | Yamaya et al. | 427/503 |
| 6,100,332 A * | 8/2000 | Yoshikawa et al. | 525/101 |
| 6,107,390 A | 8/2000 | Maeda et al. | |

(Continued)

FOREIGN PATENT DOCUMENTS

| | | |
|---|---|---|
| EP | 2243807 | 10/2010 |
| GB | 2393445 | 3/2004 |

(Continued)

*Primary Examiner* — Robert S Loewe
(74) *Attorney, Agent, or Firm* — Muncy, Geissler, Olds & Lowe, P.C.

(57) ABSTRACT

The disclosure provides a white coating composition, and a device employing a coating made of the composition. The white coating composition includes 20-55 parts by weight of silicon dioxide particles, 40-75 parts by weight of inorganic material, and 5-40 parts by weight of silsequioxane, wherein the silsequioxane is prepared from monomers comprising a first monomer represented by the Formula (I) and a second monomer represented by the Formula (II)

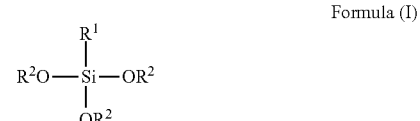

Formula (I)

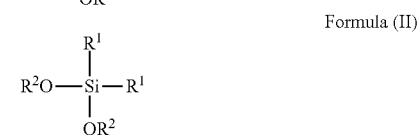

Formula (II)

wherein, $R^1$ is independently the same or different methyl or ethyl, and $R^2$ is independently the same or different $C_{1\text{-}6}$ alkyl.

9 Claims, 2 Drawing Sheets

(56) References Cited

U.S. PATENT DOCUMENTS

| | | |
|---|---|---|
| 6,605,147 B2 | 8/2003 | Rentschler et al. |
| 6,849,325 B2 | 2/2005 | Murschall et al. |
| 7,312,507 B2 | 12/2007 | Tomita |
| 7,332,782 B2 | 2/2008 | Tomita |
| 7,332,785 B2 | 2/2008 | Tomita |
| 7,514,123 B2 | 4/2009 | Onoyama et al. |
| 7,582,157 B2 | 9/2009 | Remortel et al. |
| 2003/0101908 A1 | 6/2003 | Hayashi et al. |
| 2008/0207848 A1* | 8/2008 | Morita et al. ............... 525/475 |
| 2009/0091045 A1* | 4/2009 | Tanikawa et al. ............. 257/791 |
| 2009/0163654 A1* | 6/2009 | Hirano ........................ 524/783 |
| 2009/0171013 A1* | 7/2009 | Taguchi et al. ............... 524/588 |
| 2009/0189111 A1 | 7/2009 | Zamani |
| 2009/0304961 A1* | 12/2009 | Taguchi et al. ............... 428/35.7 |
| 2009/0306263 A1* | 12/2009 | Taguchi et al. ............... 524/404 |
| 2010/0025711 A1 | 2/2010 | Barnes et al. |
| 2010/0089451 A1 | 4/2010 | Harimoto et al. |
| 2011/0042728 A1 | 2/2011 | Cheng et al. |

FOREIGN PATENT DOCUMENTS

| | | |
|---|---|---|
| JP | 2003160741 | 6/2003 |
| JP | 2003340244 | 12/2003 |
| TW | 200918585 | 5/2009 |
| TW | 201011069 | 3/2010 |
| TW | 201127907 | 8/2011 |
| WO | WO 2009045981 | 4/2009 |
| WO | WO 2009092103 | 7/2009 |

* cited by examiner

WHITE COATING COMPOSITION, AND DEVICE EMPLOYING COATING MADE THEREFROM

CROSS REFERENCE TO RELATED APPLICATIONS

This application is based upon and claims the benefit of priority from the prior Taiwan Patent Application No. 101140929, filed on Nov. 5, 2012, the entire contents of which are incorporated herein by reference.

BACKGROUND

1. Field

The technical field relates to a coating composition, and in particular, relates to a white coating composition.

2. Description of the Related Art

With the development of technology, since designs of display devices are moving toward being miniaturized, light, and thin, it is desirable to reduce the use of glass substrates. Therefore, smart phones, table PCs, digital photo frames, electronic books, and other portable devices are apt to employ a single piece of glass substrate in order to reduce the weight and thickness thereof.

In the fabrication of a device having a single piece of glass, a frame is provided first, and then the frame is subjected to processes such as etching or wiring processes. If the frame is coated with a white pigment, the frame would degrade due to high temperatures, resulting in yellowing. In general, the white coating used in a display device is made of a composition including organic polymer and white dye. The white coating is susceptible to yellowing when heated to 300° C. Therefore, the conventional white coating is not suitable for use in the fabrication of a device having a single piece of glass.

Currently, a white coating composition with inorganic compounds has been developed to solve the aforementioned problems. For example, the coating composition includes a titanium oxide mixed with a resin. The coating composition, however, also degrades under a process temperature of between 300-400° C., since a resin thereof decomposes under such conditions.

Alternately, an inorganic white coating composition has also been provided to solve the aforementioned problems. However, since it is required that the conventional inorganic white coating composition be sintered at 800° C., the display device would not bear the ultra-high temperature, and elements of the display device would be damaged.

Accordingly, a novel white coating composition suitable for the fabrication of a display device having a single piece of glass is desired.

SUMMARY

An exemplary embodiment of the disclosure provides a white coating composition, including: 20-55 parts by weight of silicon dioxide particles; 40-75 parts by weight of inorganic material, wherein the inorganic material has a refractive index larger than 2.3, and 5-40 parts by weight of silsequioxane, wherein the silsequioxane is prepared from monomers, wherein the monomers include a first monomer represented by the Formula (I), and a second monomer represented by the Formula (II)

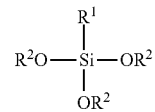

Formula (I)

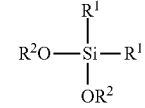

Formula (II)

wherein, $R^1$ is independently the same or different methyl or ethyl, and $R^2$ is independently the same or different $C_{1-6}$ alkyl.

According to embodiments of the disclosure, the disclosure further provides a device, such as a display device, a mobile communication device, or an optical film, including a substrate; and a white coating disposed on the substrate, wherein the white coating is prepared from the aforementioned white coating composition.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
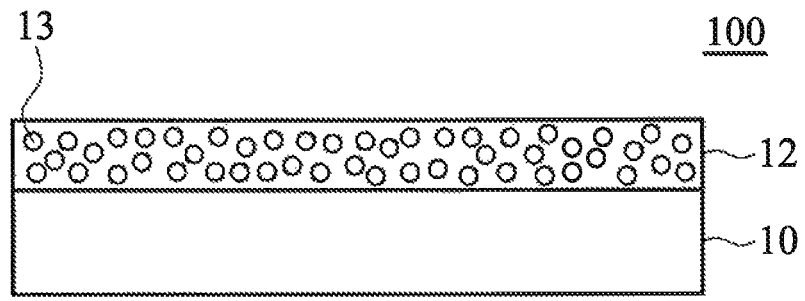
FIGS. 1 and 2 are a series of cross-section views showing devices employing the coating formed by the white inorganic coating compositions of the disclosure.

The disclosure provides a white coating composition, and a device including a white coating formed from the white coating composition. According to an embodiment of the disclosure, the white coating composition includes: 20-55 parts by weight of silicon dioxide particles; 40-75 parts by weight of inorganic material; and, 5-40 parts by weight of silsequioxane. According to another embodiment of the disclosure, the silicon dioxide particles are dispersed in a solvent in advance, forming a silica sol, and then the silica sol is mixed with the inorganic material and the silsequioxane to obtain the white coating composition, wherein the silicon dioxide particles can have a particle size from 1 to 200 nm, and the solvent can be water, alcohol solvent, glycol ether solvent, or combinations thereof. Further, the white coating composition can further include a solvent, wherein the silicon dioxide particles, inorganic material, and silsequioxane are dispersed in the solvent. The solvent can be water, alcohol solvent, glycol ether solvent, or combinations thereof. The inorganic material can be an inorganic material with a high refractive index, such as inorganic particles with a refractive index larger than 2.3. The inorganic particles can have a particle size of 150-500 nm or 200-400 nm in order to reduce the light transmittance of the white coating composition, resulting in a white coating prepared from the coating composition. For example, the inorganic material can include titania, zirconia, alumina, or combinations thereof. The silsequioxane is prepared from at least two monomers (via hydrolysis and condensation), wherein the monomer includes a first monomer represented by the Formula (I), and a second monomer represented by the Formula (II)

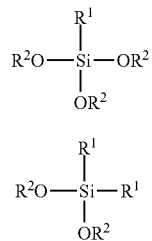

wherein, $R^1$ is independently the same or different methyl or ethyl, and $R^2$ is independently the same or different $C_{1-6}$ alkyl. According to an embodiment of the disclosure, the weight ratio between the first monomer and the second monomer is from 3:1 to 1:3. When the weight ratio between the first monomer and the second monomer is larger than 3, the composition would be apt to harden before a coating process is performed. On the other hand, when the weight ratio between the first monomer and the second monomer is less than 1/3, hardening of the composition after a coating process is performed will be difficult. According to another embodiment of the disclosure, the silsequioxane is prepared from the aforementioned first monomer represented by the Formula (I), the aforementioned second monomer represented by the Formula (II), and a third monomer via hydrolysis and condensation, wherein the third monomer has a structure represented by the Formula (III)

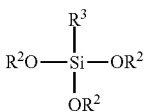

wherein, $R^2$ is independently the same or different $C_{1-6}$ alkyl, and $R^3$ is

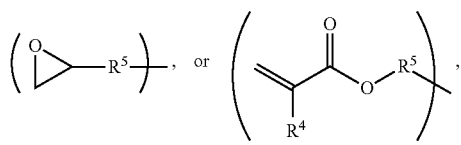

wherein $R^4$ is hydrogen, or methyl, and $R^5$ is

wherein n is 0 or 1, and $R^6$ is independently the same or different $C_{1-3}$ alkylene. For example, the third monomer can be acryloxypropyltrimethoxysilane, or 3-glycidoxypropyltrimethoxysilane. The third monomer can have a weight percentage from 0.1 to 10 wt % (based on the weight of the first monomer and second monomer). Due to the addition of the third monomer, the properties, such as adhesion, hardness, or low-temperature formability, of the coating prepared from the composition of the disclosure can be adjusted by controlling the amount of the third monomer. When the weight percentage of the third monomer is too high (such as being larger than 10 wt %), yellowing may occur to the coating prepared from the composition of the disclosure. In order to decrease the light transmittance of the white coating composition, the white inorganic coating composition includes the inorganic material, thereby making the obtained coating to have a white appearance. Further, the silsequioxane can improve the film-forming ability of the composition due to the net structure of the silsequioxane. On the other hand, the silicon dioxide particles-containing silica sol can enhance the mechanical strength of the obtained coating prepared from the composition of the disclosure. Thus, the composition may be used in various applications.

For example, the composition of the disclosure can include 40-75 parts by weight (such as 40-70 or 40-60 parts by weight) of the inorganic material. If the parts by weight of the inorganic material is too high (such as being larger than 75), the composition will have an inferior film-forming ability. To the contrary, if the parts by weight of the inorganic material is too low (such as being less than 40), the coating will not have a white appearance due to the high transparency thereof. On the other hand, the composition of the disclosure can include 5-40 parts by weight (such as 5-30 or 5-20 parts by weight) of the silsequioxane. If the parts by weight of the silsequioxane are too low (such as being less than 5), the composition will have an inferior film-forming ability. To the contrary, if the parts by weight of the silsequioxane are too high (such as being larger than 40 parts by weight), the coating will not have a white appearance due to the high transparency thereof.

The composition can include 20-55 parts by weight (such as 20-50 or 20-40 parts by weight) of the silicon dioxide particles. If the parts by weight of the silicon dioxide particles are less than 20 parts by weight, the obtained coating will have an inferior hardness. If parts by weight of the silicon dioxide particles are more than 55 parts by weight, the obtained coating will crack during the formation of the coating, resulting in a non-continuous coating.

The white coating composition of the disclosure can be coated on a substrate via a screen printing or spin coating process. After being coated on the substrate, the composition can be subjected to a thermal process to form a white coating. The temperature of the thermal process can be a temperature of 50-350° C. Further, the thermal process can be a multi-stage heat treatment (baking at various temperatures (within 50-350° C.) and times).

The coating fabricated by the white coating composition of the disclosure exhibits a high thermal resistance (achieving to 400° C.) and is not apt to yellowing. Further, the aforementioned coating has high tolerance against variations in subsequent processes and can be suitable for application as a paint for a display device.

According to some embodiments of the disclosure, the disclosure provides a device, such as a display device, a mobile device, or an optical film. Referring to FIG. 1, the device 100 can include a substrate 10, and a white coating 12 disposed on substrate 10, wherein the white coating 12 is formed by coating and sintering of the white coating composition. The white coating 12 includes inorganic particles 13 (such as titania, zirconia, or alumina) with high refractive indices.

Figure 2:
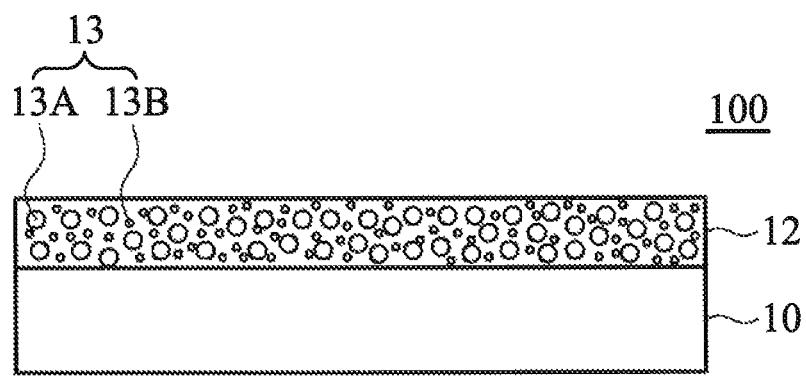

The inorganic particles 13 with high refractive indices can have a fixed particle size (as shown in FIG. 1). Further, the inorganic particles 13 can consist of a first type of inorganic particles 13A with a relatively larger particle size and a second type of inorganic particles 13B with a relatively smaller particle size (as shown in FIG. 2). Meanwhile, the inorganic particles 13B with the relatively smaller particle sizes can serve as connecting points to improve the film-forming ability.

The following examples are intended to illustrate the embodiment more fully without limiting their scope, since numerous modifications and variations will be apparent to those skilled in this art.

Preparation of the White Coating Composition

Example 1

11 g of titania (rutile form), 6.6 g of silsequioxane (prepared from 2.5 g methyltrimethoxysilane (MTMS) and 7.5 g of dimethyldimethoxysilane (DMDMS), and 1.0 g of acryloxypropyltrimethoxysilane (APMS) via hydrolysis and condensation in the presence of acid), and 5.5 g of silicon dioxide (dispersed in 17 ml of isopropanol) were added into a reaction bottle, and dissolved in 4 ml of dipropylene glycol monomethyl ether (as solvent). After stirring, a white coating composition (1) was obtained.

Example 2

10 g of titania (rutile form), 3.3 g of silsequioxane (prepared from 2.5 g of methyltrimethoxysilane (MTMS), 2.5 g of dimethyldimethoxysilane (DMDMS), and 0.5 g of acryloxypropyltrimethoxysilane (APMS) via hydrolysis and condensation in the presence of acid), and 8 g of silicon dioxide (dispersed in 24 ml of isopropanol) were added into a reaction bottle, and dissolved in 5 ml of dipropylene glycol monomethyl ether (as solvent). After stirring, a white coating composition (2) was obtained.

Example 3

20 g of titania (rutile form), 2.1 g of silsequioxane (prepared from 2.5 g of methyltrimethoxysilane (MTMS), 0.8 g of dimethyldimethoxysilane (DMDMS), and 0.2 g of acryloxypropyltrimethoxysilane (APMS) via hydrolysis and condensation in the presence of acid), and 6 g of silicon dioxide (dispersed in 18 ml of isopropanol) were added into a reaction bottle, and dissolved in 5 ml of dipropylene glycol monomethyl ether 5 ml (as solvent). After stirring, a white coating composition (3) was obtained.

Example 4

8 g of titania (rutile form), 2.8 g of silsequioxane (prepared from 1.2 g of methyltrimethoxysilane (MTMS), 3.5 g of dimethyldimethoxysilane (DMDMS) via hydrolysis and condensation in the presence of acid), and 6.6 g of silicon dioxide (dispersed in 20 ml of isopropanol) were added into a reaction bottle, and dissolved in 4 ml of dipropylene glycol monomethyl ether (as solvent). After stirring, a white coating composition (4) was obtained.

Comparative Example 1

12 g of titania (rutile form), and 8 g of silicon dioxide (dispersed in 24 ml of isopropanol) were added into a reaction bottle, and dissolved in 5 ml of dipropylene glycol monomethyl ether (as solvent). After stirring, a white coating composition (5) was obtained.

Comparative Example 2

10 g of titania (rutile form), silsequioxane (prepared from 3 g of acryloxypropyltrimethoxysilane (APMS) via hydrolysis and condensation in the presence of acid), and 8 g of silicon dioxide (dispersed in 24 ml of isopropanol) were added into a reaction bottle, and dissolved in 5 ml of dipropylene glycol monomethyl ether (as solvent). After stirring, a white coating composition (6) was obtained.

Comparative Example 3

10 g of titania (rutile form), silsequioxane (prepared from 3 g of dimethyldimethoxysilane via hydrolysis and condensation in the presence of acid), and 8 g of silicon dioxide (dispersed in 24 ml of isopropanol) were added into a reaction bottle, and dissolved in 5 ml of dipropylene glycol monomethyl ether (as solvent). After stirring, a white coating composition (7) was obtained.

Measurement of White Coatings

The white coating composition (1)-(7) prepared from Example 1-4 and Comparative Example 1-3 were respectively coated to a glass substrate via screen printing. After respectively baking at 50° C., 150° C., and 230° C. for 30 min, the white coatings (1)-(7) were respectively obtained. Next, the white coatings (1)-(7) were checked to determine whether defects such as yellowing or unhardened composition portions were observed.

Further, the adhesions of the white coatings (1)-(7) were evaluated according to the ASTM D3359 standard tape test, and the results are shown in Table 1.

TABLE 1

| | SiO$_2$ (g) | weight percentage of the starting material of the silsequioxane | | | TiO$_2$ (g) | Yellowing | film-forming ability | adhesion |
| | | MTMS (wt %) | DMDMS (wt %) | APMS (wt %) | | | | |
| --- | --- | --- | --- | --- | --- | --- | --- | --- |
| Example 1 | 5.5 | 22.5 | 67.5 | 10 | 11 | no | good | good |
| Example 2 | 8.0 | 45.5 | 45.5 | 9 | 10 | no | good | good |
| Example 3 | 6.0 | 71.4 | 23.8 | 4.8 | 20 | no | good | good |
| Example 4 | 6.6 | 24 | 75 | 0 | 8 | no | good | fair |
| Comparative Example 1 | 8 | 0 | 0 | 0 | 12 | no | good | bad |
| Comparative Example 2 | 8 | 0 | 0 | 3 | 10 | yes | good | good |

TABLE 1-continued

| | weight percentage of the starting material of the silsequioxane | | | | | film-forming ability | adhesion |
|---|---|---|---|---|---|---|---|
| | SiO$_2$ (g) | MTMS (wt %) | DMDMS (wt %) | APMS (wt %) | TiO$_2$ (g) | Yellowing | |
| Comparative Example 3 | 8 | 0 | 3 | 0 | 10 | no | bad | fair |

The white coatings (1) and (2) prepared from the Examples 1 and 2 were subjected to an optical density measurement, and the results are shown in Table 2. Next, the white coatings (1) and (2) were subjected to a thermal treatment (baked at a temperature of 350° C. for 30 min). After the thermal treatment, the white coatings (1) and (2) were subjected to an optical density measurement again, and the results are shown in Table 2.

TABLE 2

| | optical density (OD) | |
|---|---|---|
| | Before treatment | After treatment |
| white coating (1) | 0.99 | 0.99 |
| white coating (2) | 1.00 | 1.01 |

Figure 3:
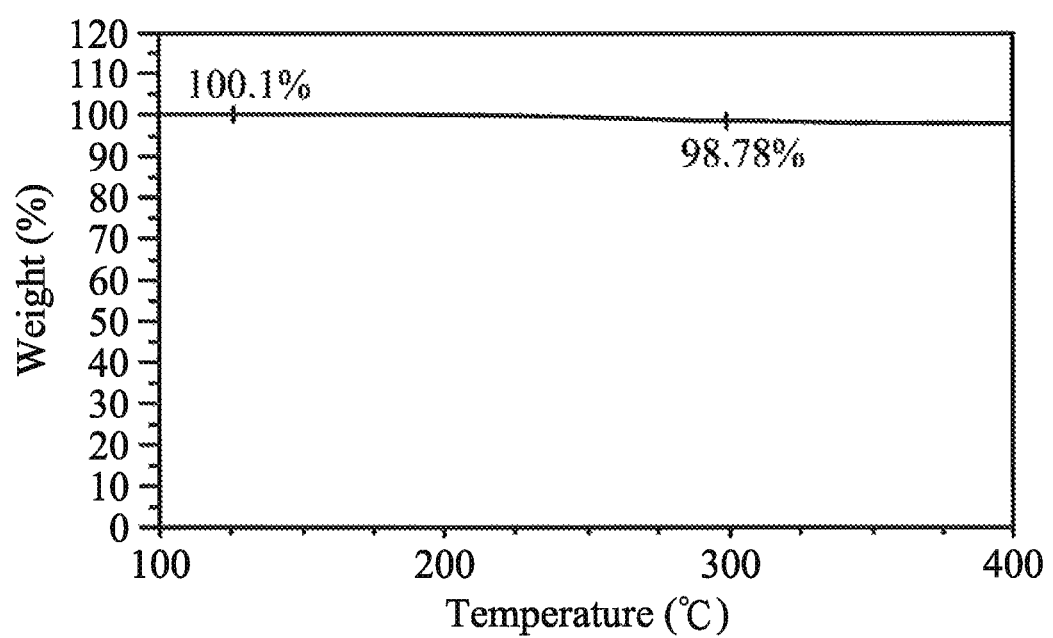
FIG. 3 shows a graph plotting operating weight against temperature of the coating prepared from the white coating composition (1).

The white coating composition (1) prepared from Example 1 was coated on a substrate to form a coating. Next, the coating was heated gradually from 100° C. to 400° C., and the weight of the coating was continuously measured with rising temperatures, as shown in FIG. 3. It should be noted that the coating had a weight loss of less than 5% at 400° C.

Accordingly, the coating prepared by the white coating composition of the disclosure had high thermal stability, which is suitable for applications in displays or mobile devices to solve the degrading problems of conventional white coatings.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A white coating composition, comprising:
   20-55 parts by weight of silicon dioxide particles;
   40-75 parts by weight of inorganic material; and
   5-40 parts by weight of silsequioxane, wherein the silsequioxane is prepared from monomers comprising a first monomer represented by the Formula (I), a second monomer represented by the Formula (II), and a third monomer represented by the Formula (III)

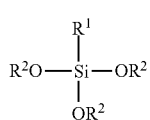

Formula (I)

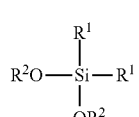

Formula (II)

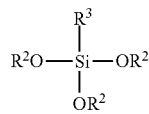

Formula (III)

wherein R$^1$ is independently the same or different methyl or ethyl, R$^2$ is independently the same or different C$_{1-6}$ alkyl, and R$^3$ is

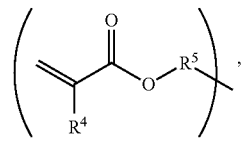

wherein R$^4$ is hydrogen, or methyl, and R$^5$ is

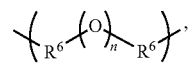

wherein n is 0 or 1, and R$^6$ is independently the same or different C$_{1-3}$ alkylene.

2. The white coating composition as claimed in claim 1, wherein the silicon dioxide particles are dispersed in a solvent, forming a silica sol.

3. The white coating composition as claimed in claim 1, wherein the inorganic material comprises titania, zirconia, alumina, or combinations thereof.

4. The white coating composition as claimed in claim 1, wherein the silicon dioxide particles has a particle size from 1 to 200 nm.

5. The white coating composition as claimed in claim 1, wherein the inorganic material has a particle size from 150 to 500 nm.

6. The white coating composition as claimed in claim 1, wherein the inorganic material has a refractive index larger than 2.3.

7. The white coating composition as claimed in claim 1, wherein the weight ratio between the first monomer and the second monomer is from 3:1 to 1:3.

8. The white coating composition as claimed in claim 1, wherein the third monomer has a weight percentage of 0.1-10 wt %, based on the weight of the first monomer and second monomer.

9. A device, comprising:
a substrate; and
a white coating disposed on the substrate, wherein the white coating is prepared from the white coating composition as claimed in claim 1.

* * * * *